(12) United States Patent
Ma

(10) Patent No.: US 6,373,857 B1
(45) Date of Patent: Apr. 16, 2002

(54) GATEKEEPER TRANSPORT ADDRESS DETERMINATION IN AN INTERNET TELEPHONY SYSTEM USING A DOMAIN ALIAS

(75) Inventor: Patrick SzeChing Ma, Plano, TX (US)

(73) Assignee: Nortel Networks Ltd., St. Laurent (CA)

( * ) Notice: Subject to any disclaimer, the term of this patent is extended or adjusted under 35 U.S.C. 154(b) by 0 days.

(21) Appl. No.: 09/191,899

(22) Filed: Nov. 13, 1998

(51) Int. Cl.$^7$ .................................................. H04J 3/24
(52) U.S. Cl. ...................................... 370/475; 370/395.2
(58) Field of Search .............................. 370/230, 254, 370/351–7, 395.2, 395.52, 395.61, 431, 475

(56) References Cited

U.S. PATENT DOCUMENTS

| | | | |
|---|---|---|---|
| 5,999,525 A | * 12/1999 | Krishnaswamy et al. | 370/352 |
| 6,161,008 A | * 12/2000 | Lee et al. | 455/414 |
| 6,185,288 B1 | * 2/2001 | Wong | 379/219 |
| 6,275,574 B1 | * 8/2001 | Oran | 379/201 |
| 6,308,267 B1 | * 10/2001 | Gremmelmaier | 713/168 |

OTHER PUBLICATIONS

Stevens, TCP/IP Illustrated, vol. 1, 1994, PP:187–208.*

* cited by examiner

Primary Examiner—David R. Vincent
(74) Attorney, Agent, or Firm—Bruce Garlick

(57) ABSTRACT

An Internet Protocol (IP) telephony system cross-references transport addresses of Gatekeepers using a domain name of the IP telephony system. The IP telephony system is serviced by at least one Gatekeeper and the transport address for each Gatekeeper is stored on a Domain Name Server (DNS). An A record or other suitable record may be employed within the DNS to index the transport addresses of the Gatekeepers to the IP telephony system domain name. A calling endpoint first queries the DNS for the transport address of a Gatekeeper servicing the IP telephony system. The DNS address retrieves at least one transport address for the Gatekeeper(s) and returns the transport address(es) to the calling endpoint. When querying the DNS, the calling endpoint may use an identifier such as subscribername@Gatekeeper.ABC.domain where the user name of the called endpoint is "subscribername" and the domain name of the IP telephony system is ABC.domain.

20 Claims, 5 Drawing Sheets

GATEKEEPER TRANSPORT ADDRESS DETERMINATION IN AN INTERNET TELEPHONY SYSTEM USING A DOMAIN ALIAS

BACKGROUND

1. Technical Field

The present invention relates generally to Internet Telephony systems; and more particularly to a method and apparatus for employing aliases to determine transport addresses of Internet Telephony system Gatekeepers.

2. Related Art

Internet Protocol (IP) Telephony systems have been rapidly evolving over the past few years. In an IP telephony system, calls are routed through a packet switched Internet Protocol network (IP network). This compares to call routing in a circuit switched system, such as the Public Switched Telephone System (PSTN), in which calls are routed over dedicated circuits. In a circuit switched network, digitized information making up a call is sent in a continuous stream (when active) from a caller to a called party, and vice versa. However, in a packet switched IP Telephony system, each segment of the call is converted into IP packets, routed through the IP network, reconstructed upon exiting the IP network and then delivered to a called party.

With IP packet switching, as opposed to circuit switching, network bandwidth usage for each call may be reduced because a dedicated circuit is not created for each call. However, as is generally known, IP telephony system networks cannot presently provide the Quality of Service (QoS) that is provided by circuit switched networks. Thus, IP telephony has yet to obtain the popularity of circuit switched telephony for voice communications which require a minimal level of QoS. Nonetheless, IP telephony systems yield acceptable results in some situations, particularly those situations in which PSTN tariffs are great, e.g., international calls. An international call placed and serviced by an IP telephony system can oftentimes be made for the cost of a local phone call.

In initiating a call in an IP telephony system, a calling endpoint couples to the IP network via a source Gateway, oftentimes coupling to the source Gateway via the PSTN or another network, e.g., Local Area Network or Wide Area Network. The source Gateway then interfaces with a Gatekeeper to setup the call. The Gatekeeper sets up the call with a called endpoint, usually via a destination Gateway. The call is then routed from the caller, through the source Gateway, via the IP network to the destination Gateway, and from the destination Gateway to the called party. From the destination Gateway to the called party, the call may be routed via the PSTN. The source and destination Gateways convert the call between IP based data packets that are routed across the IP network and the circuit switched counterparts that are received from, and delivered to the endpoints via the PSTN.

In most Internet Telephony systems, the service providers route all calls through their Gatekeepers. By routing the calls through their Gatekeepers, the service provider monitors usage for billing purposes, alters IP network routes to compensate for outages and routes calls to various destination Gateways to balance load upon the destination Gateways.

The Gatekeepers perform various management functions for a group of registered endpoints (subscribers). These functions include, but are not limited to, address resolution, call admission control and bandwidth management. Each subscriber registers with a particular Gatekeeper and the Gatekeeper with which the subscriber registers services the subscriber until such time as the subscriber de-registers. In servicing the subscriber, the Gatekeeper stores a current transport address for the subscriber, which is the IP address at which the subscriber couples to the IP network. Where the subscriber couples to the IP network via a Gateway, the transport address is the IP address of the Gateway.

When one subscriber desires to call another subscriber, the calling subscriber must have the transport address of the called subscriber. However, the transport address is dynamic since the IP address of the subscriber can change from time to time, e.g., if the subscriber is assigned to a different Gateway or if the subscriber couples to the IP network at a differing location. Thus, the transport address is typically stored by a Gatekeeper servicing the called subscriber. In initiating a call, the subscriber must first access the called subscriber's servicing Gatekeeper to determine the transport address for the called endpoint.

In order to access the called subscribers Gatekeeper, the subscriber must have the transport address of the Gatekeeper. But, the subscriber does not know the transport address of the Gatekeeper unless he is notified of such by the service provider or the called subscriber. Thus, the calling subscriber must manually determine the called subscriber's serving Gatekeeper. While such a determination is possible, if the called party de-registers from the Gatekeeper and re-registers with another Gatekeeper, the calling subscriber must determine the new transport address. Such de-registration and re-registration operations often occur when new Gatekeepers are deployed. Thus, such a problem is recurrent.

Thus, there is a need in the art for an IP telephony system in which the transport address of each endpoint may easily be determined without requiring a manual determination of the called subscriber's Gatekeeper.

SUMMARY OF THE INVENTION

Thus, to overcome the shortcomings of the prior systems, among other shortcomings, an Internet Protocol (IP) telephony system constructed according to the present invention cross-references transport addresses of Gatekeepers using a domain name of the IP telephony system. In one embodiment, the IP telephony system is serviced by at least one Gatekeeper and the transport address for each Gatekeeper is stored on a Domain Name Server (DNS). An A record or other suitable record may be employed within the DNS to index the transport addresses of the Gatekeepers to the IP telephony system domain name.

When a calling endpoint desires to initiate a call to a called endpoint, the calling endpoint first queries the DNS for the transport address of a Gatekeeper servicing the IP telephony system. The DNS, in response to the query, retrieves a transport address for the Gatekeeper (or multiple transport addresses for multiple Gatekeepers) and returns the transport address to the calling endpoint. When querying the DNS, the calling endpoint may use an identifier such as subscribername@Gatekeeper.ABC.domain where the user name of the called endpoint is "subscribername" and the domain name of the IP telephony system is ABC.domain. Based upon the structure of the DNS query, therefore, the DNS determines that the query is for a Gatekeeper transport address and operates accordingly.

The calling endpoint then sends a Locate Request to the servicing Gatekeeper at the transport address returned by the DNS. If the Gatekeeper receiving the Locate Request services the called endpoint, it returns a transport address for the called endpoint. If not it responds accordingly. When the DNS returns multiple transport addresses, the calling endpoint may access each respective Gatekeeper before retrieving the transport address of the called endpoint. With the transport address retrieved, the calling endpoint then initiates a call to the called endpoint.

Moreover, other aspects of the present invention will become apparent with further reference to the drawings and specification which follow.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
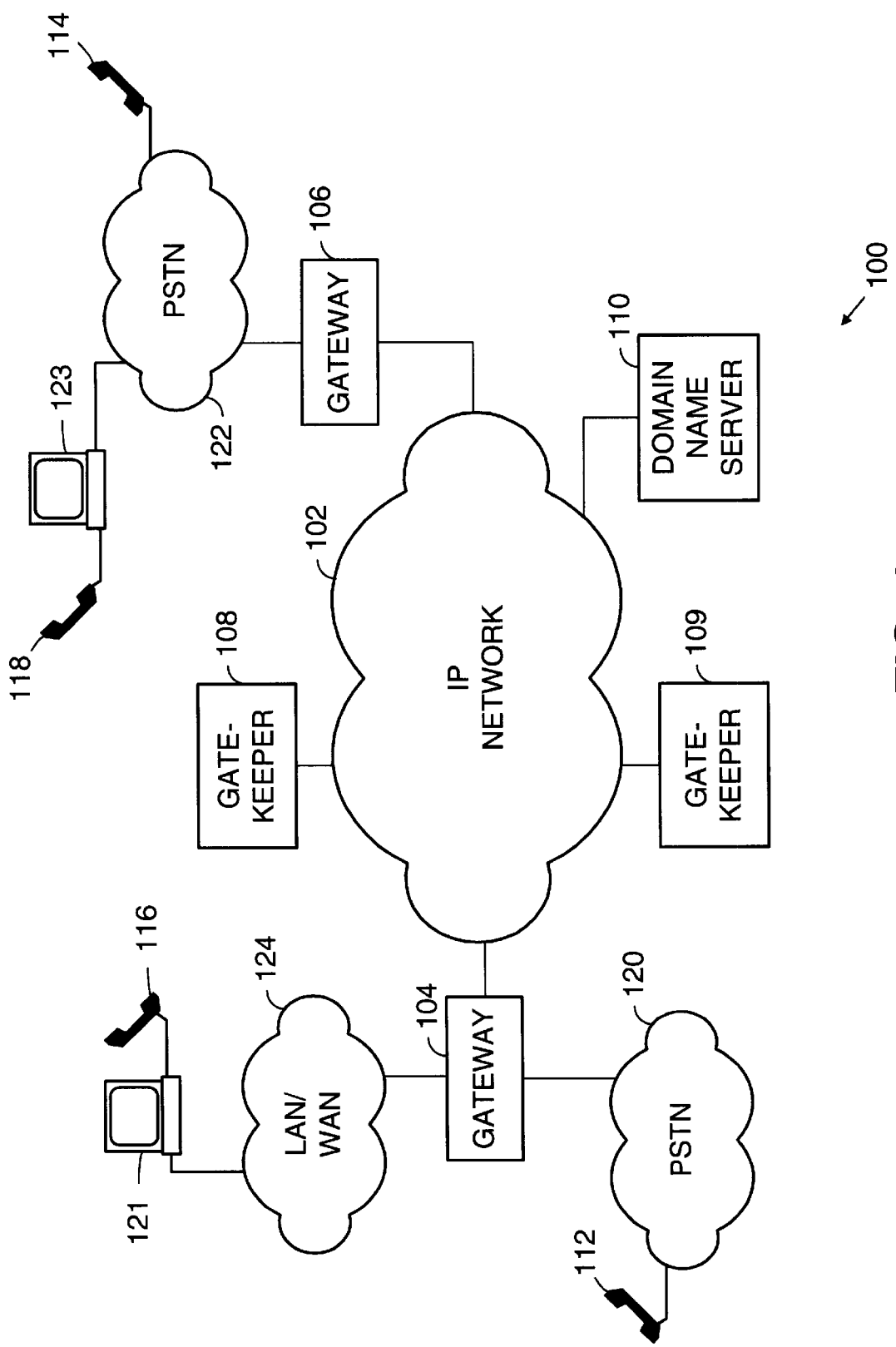
FIG. 1 is a system diagram illustrating an Internet Protocol telephony system constructed according to the present invention in which the transport addresses of Gatekeepers serving the system are stored on a Domain Name Server and accessible using a domain name of the Internet Protocol telephony system.

FIG. 1 is a system diagram illustrating an Internet Protocol (IP) telephony system constructed according to the present invention in which the transport addresses of Gatekeepers serving the system are stored on a Domain Name Server and accessible using a system domain name. In the description hereinafter, Gatekeeper "IP address" and Gatekeeper "transport address" will be referred to interchangeably and are intended to be equivalent.

Referring to FIG. 1, the IP telephony system includes a plurality of Gateways 104 and 106 coupled to an IP network 102. The system also includes a plurality of Gatekeepers 108 and 109 that are also coupled to the IP network 102. Also included is a Domain Name Server (DNS) 110. Together, the Gateways 104 and 106 and Gatekeepers 108 and 109 provide IP telephony service to a plurality of endpoints 112, 114, 116 and 118.

As can been seen, the Gateways 104 and 106 couple endpoints 112 and 114 to the IP network 102 via respective segments of the Public Switched Telephone Network (PSTN) 120 and 122. The Gateways 104 and 106 therefore convert calls serviced by the endpoints 112 and 114 between a PSTN circuit switched data format and IP data packets. Thus, the Gateways 104 and 106 include Coder/Decoders (CODECs), digital processing equipment, networking equipment and other equipment required for data conversion functions and network management functions.

Endpoints that are coupled to Gateways (or to the IP network 102 itself) may also be serviced according to the present invention. For example, endpoint 116 couples to Gateway 104 via a host computer 121 and a local area network or wide area network (LAN/WAN) 124. In such example, the LAN/WAN 124 may support the IP protocol. Thus, the host computer 121 includes a CODEC which converts data that makes up a call between a format compatible with the endpoint 116 and the LAN/WAN 124. In a particular example of construction of the host computer 121, the host computer 121 includes a sound card which connects directly to the endpoint 116. The sound card receives analog signals from the endpoint 116 and converts them to digital equivalents. The sound card also receives digital signals, converts the digital signals to an equivalent analog signal, and delivers the equivalent analog signal to the endpoint 116.

Another type of endpoint supported by the IP telephony system is the endpoint 118 supported by a host computer 123 that couples to Gateway 106 via PSTN segment 122. In such an installation, the endpoint 118 couples to the host computer 123 via a sound card as described above. The host computer 123 then couples to the Gateway 106 via the PSTN segment 122 over an analog or digital line using an appropriate modem, e.g., analog modem, Integrated Services Digital Network (ISDN) modem, T-1 modem, etc.

The Gatekeepers 108 and 109 perform call setup and servicing functions for calls established using the IP telephony system. The Gateways 104 and 106 and Gatekeepers 108 and 109 may operate in compliance with the H.323 standard promulgated by the International Telecommunications Union (ITU-T). The H.323 standard covers the technical requirements for audio and video communications services in networks that do not provide a guaranteed Quality of Service (QoS), e.g., the IP network 102. The scope of H.323 does not include the IP network 102 itself or the transport layer that may be used to connect various networks (such as the IP network 102 and LAN/WAN 124). Elements needed for interaction with the PSTN 120 or 122 are also within the scope of H.323. As pertinent to the present invention, H.323 includes specifications for endpoints, Gateways and Gatekeepers.

Endpoints, such as endpoints 112, 114, 116 and 118, are the client endpoints that provide real-time, two-way voice communications. H.323 specifies the modes of operation required for different audio endpoints that work together. All H.323 endpoints support H.225 which specifies call signaling protocol and is employed to negotiate channel usage and capabilities. H.323 also includes a component called Registration/Admission/Status (RAS) which endpoint units use to communicate with a Gatekeeper during registration, admission and status operations. However, many endpoints do not support RAS.

Gateways, e.g., 104 and 106, are optional elements in an H.323 conference. Gateways provide many services, the most common being a translation function between H.323 conferencing endpoints and other endpoint types. This function includes translation between transmission formats (e.g., H.225.0 to H.221) and between communications procedures (e.g., H.245 to H.242). In addition, the Gateways 104 and 106 also perform operations during call setup and call clearing on both the IP network 102 side and the PSTN 120 and 122 side.

Operations supported by the Gateways 104 and 106 include establishing links with analog PSTN endpoints, establishing links with remote H.320-compliant endpoints over ISDN-based circuit-switched networks, and establishing links with remote H.324-compliant endpoints over PSTN networks. Gateways are not required if connections to other networks are not needed, since endpoints may directly communicate with other endpoints on the same packet switched network, such as the LAN/WAN 124 or IP network 102.

The Gatekeepers 108 and 109 act as the central point for all calls within their respective Gatekeeper zones and provide call control services to registered endpoints. In any ways, an H.323 Gatekeeper acts as a virtual switch. Gatekeepers 108 and 109 perform two important call control functions. The first is address translation from network aliases for endpoints and Gateways to IP or IPX addresses. The second function is bandwidth management. For instance, if a network manager has specified a threshold for the number of simultaneous conferences on the network, the Gatekeeper 108 or 109 can refuse to make any more connections once the threshold is reached.

The collection of all endpoints and Gateways managed by a single Gatekeeper 108 or 109 is known as the Gatekeeper zone. Thus, when an IP telephony system operator deploys multiple Gatekeepers, such as illustrated with Gatekeepers 108 and 109, each Gatekeeper is responsible for a Gatekeeper Zone, a set of registered subscribers or another portion of the load serviced by the IP telephony system (such divisions generally referred to as "load segments"). While a Gatekeeper 108 or 109 is logically separate from Gateways 104 and 106, vendors may incorporate Gatekeeper functionality into the physical implementation of Gateways 104 or 106. Thus, the devices may be co-located where a service provider has available physical space.

An optional, but valuable feature of a Gatekeeper 108 or 109 is its ability to route H.323 calls. By routing a call through a Gatekeeper 108 or 109, the call may be controlled more effectively. Service providers need this ability in order to bill for calls placed through their network. This service can also be used to re-route a call to another endpoint if a called endpoint is unavailable.

In a typical operation, an endpoint 112 (calling subscriber) initiates a call to endpoint 114 (called subscriber). Upon call initiation, the endpoint 112 dials Gateway 104 via the PSTN 120. The Gateway 104 answers the call and performs initial call setup. The endpoint 112 then queries the DNS 110 for the transport address of a Gateway (108 or 109) serving endpoint 114. In a present example, the domain name of the IP telephony system is "ABC.domain" and the subscriber name of the endpoint 114 is "calledsubscriber". Thus, according to the present invention, the endpoint 112 sends a query to the DNS 110 seeking an IP address for calledsubscriber.Gatekeeper.ABC.domain.

The DNS 110 recognizes the query as seeking a transport address of a Gatekeeper because the term "Gatekeeper" is attached to the domain name. Because the DNS 110 has contained therein A records for the Gatekeepers 108 and 109, the DNS 110 returns the transport addresses (IP addresses) for the Gatekeepers 108 and 109 to the calling endpoint 112. The calling endpoint 112 then sends a Location Request to the Gatekeeper 108 requesting a transport address for the called endpoint 114, sending the username "calledsubscriber" to the Gatekeeper 108. If the Gatekeeper 108 is the serving Gatekeeper, it returns the transport address of the called endpoint 114 to the calling endpoint 112. However, if it is not, it responds accordingly and the calling endpoint 112 sends a Location Request to Gatekeeper 109. If the Gatekeeper 109 services called endpoint 114, it responds with the transport address of the calling endpoint 114. In such case, the calling endpoint 112 sends an Admission Request to its own serving Gatekeeper to make a call to called endpoint 114. If Admitted, the call is serviced to completion.

Figure 2:
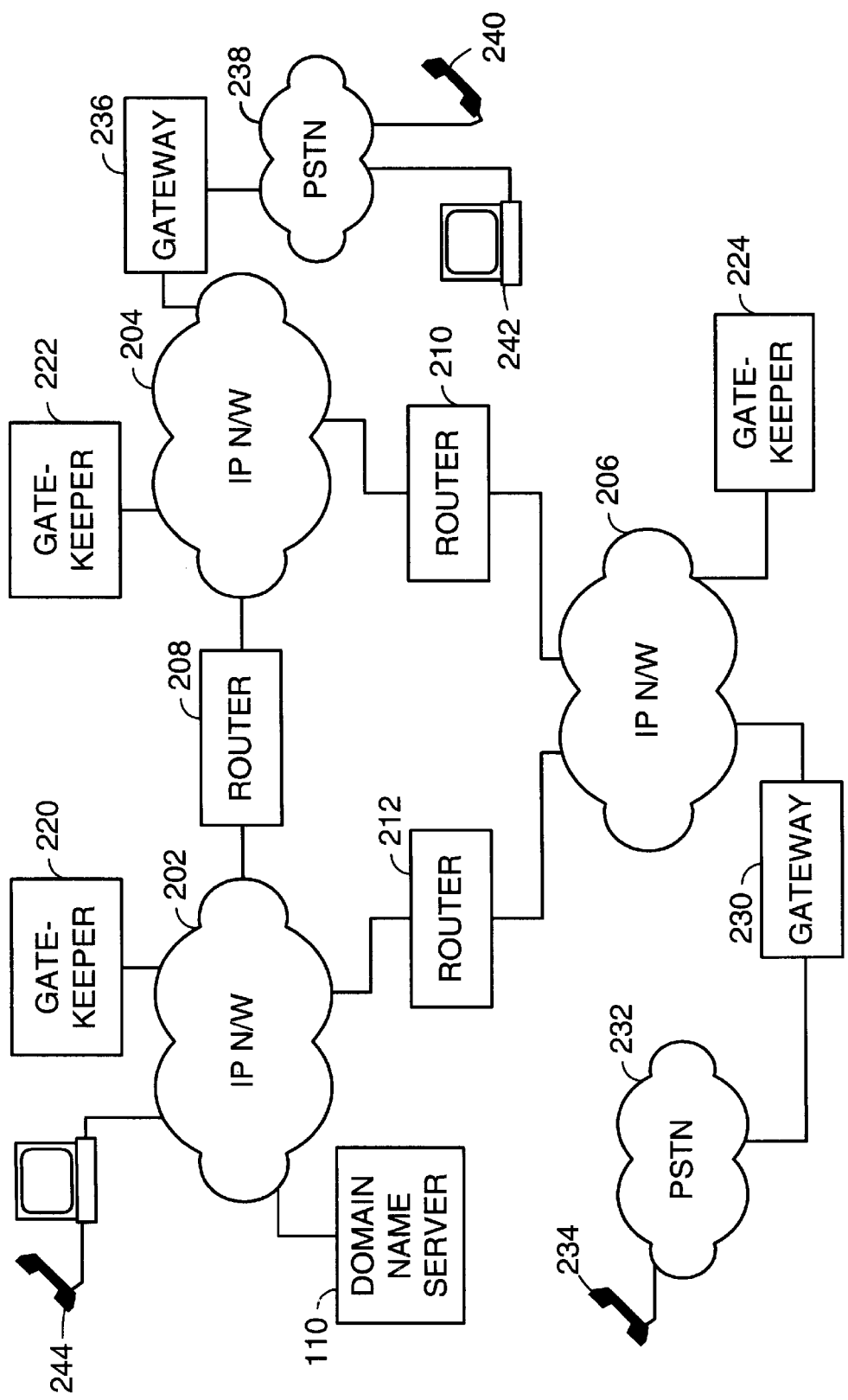
FIG. 2 is a system diagram illustrating an alternate construction of an Internet Protocol telephony system according to the present invention.

FIG. 2 is a system diagram illustrating an alternate construction of an Internet Protocol telephony system according to the present invention. As shown, the IP telephony system routes calls via three different IP networks 202, 204 and 206. The IP telephony system is served by a DNS 110. These IP networks may comprise three private IP networks, a combination of public and private IP networks or three public IP networks. As an alternate view of the IP networks, the three IP networks 202, 204 and 206 comprise three Gatekeeper zones of an IP network. In any case, the IP networks 202, 204 and 206 are intercoupled by routers 208, 210 and 212.

A respective Gatekeeper serves each of the three IP networks 202, 204 and 206. As is shown Gatekeepers 220, 222 and 224 serve IP networks 202, 204 and 206 respectively. As is also shown, endpoint 234 couples to IP network 206 via the PSTN 232 and Gateway 230. Further, endpoints 240 and 242 couple to IP network 204 via the PSTN 238 and Gateway 236. As is shown, endpoint 242 is a computer having multimedia capability and including a microphone and speakers, but being without a standard handset. Moreover, endpoint 244 couples directly to IP network 202. Of course, many additional endpoints may also couple to the IP networks 202, 204 and 206 via various system components.

In an example of operation, calling endpoint 244 desires to call called endpoint 242. During a RAS registration process, called endpoint 242 had previously registered with Gatekeeper 220. However, Calling endpoint 244 does not know the transport address of the Gatekeeper 220. Thus, the calling endpoint 244 sends a query to the DNS 110, sending a uniform resource identifier of calledsubscriber@Gatekeeper.ABC.domain to the DNS 110. The DNS 110 returns the transport address of the Gatekeepers 220, 222 and 224 to the calling endpoint 244. The calling endpoint 244 then accesses the Gatekeepers 220, 222 and 224 to determine which Gatekeeper, if any, serves the called endpoint 242. Once the calling endpoint 244 is apprised of the serving Gatekeeper, the calling endpoint 244 sends a Location Request to the Gatekeeper, receives a transport address for the called endpoint 242 and initiates a call to the called endpoint 242 via is own serving Gatekeeper.

In the present example, if the domain name provided to the DNS 110 is respective to an IP network, e.g., IP network 202, serviced by only a single Gatekeeper, e.g., Gatekeeper 220, the DNS 110 returns the transport address of the Gatekeeper 220. The calling endpoint 244 then sends a Location Request to the Gatekeeper 220 identifying the called endpoint 242 via a respective user name. The Gatekeeper 220, if it services the called endpoint 242, returns the transport address of the called endpoint 242. Calling endpoint 244 then initiates a call to called endpoint 242 based upon the transport address of the called endpoint 242.

Figure 3A:
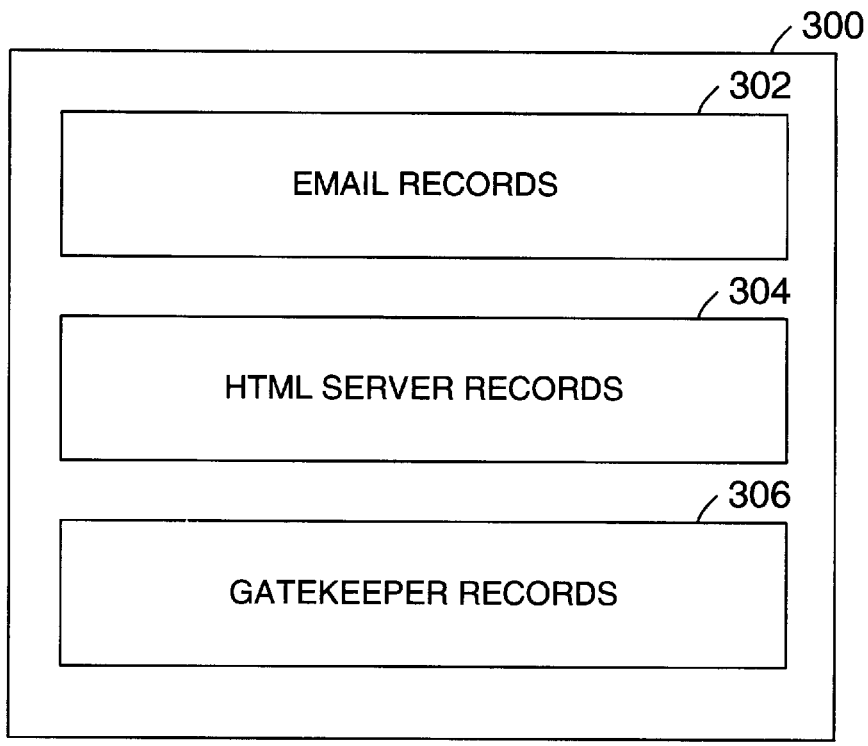
FIG. 3A is a block diagram illustrating the organization of information of a Domain Name Server according to the present invention.

FIG. 3A is a block diagram illustrating the organization of information of a Domain Name Server according to the present invention. The DNS 300 stores Email Records 302, HTML Server Records 304 and Gatekeeper Records 306 among other records. According to the present invention, at least one A record is added to the DNS 300 for each Gatekeeper serving the IP telephony system. The IP telephony system is identified within the DNS 300 by a domain name, e.g., ABC.domain. The Gatekeeper A records are therefore referenced by the prefix "Gatekeeper" such that the Gatekeeper A records are referenced by the index "Gatekeeper.ABC.domain". A records for multiple Gatekeepers serving a single domain may also be referenced separately according to their individual Gatekeeper designations.

Figure 3B:
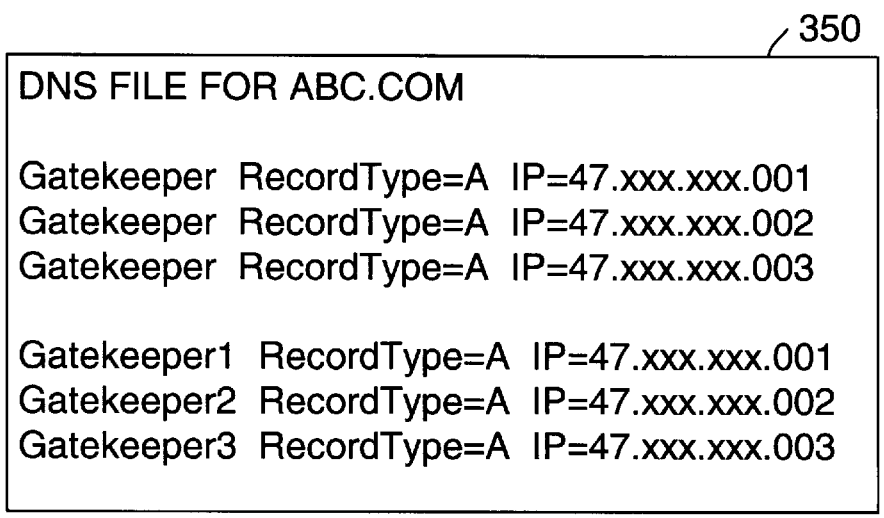
FIG. 3B is a diagram illustrating records contained in a Domain Name Server for the Gatekeepers of FIG. 3A.

FIG. 3B is a diagram illustrating records contained in a Domain Name Server for the Gatekeepers of FIG. 3A. As shown, the DNS contains Gatekeeper entries 350 for an IP telephony system having three Gatekeepers, Gatekeeper1, Gatekeeper2 and Gatekeeper3 and that has a domain name of "ABC.domain". A query of the DNS of the type calledsubscriber@Gatekeeper.ABC.domain will produce at least one IP address corresponding to the Gatekeepers. In one embodiment, all Gatekeeper IP addresses (transport addresses) will be provided in a response to the query so that the requesting endpoint will receive all Gatekeepers that potentially serve another endpoint of interest. Note that each of the Gatekeepers may also be accessed by particular reference, e.g., calledsubscriber@Gatekeeper1.ABC.domain.

Figure 4:
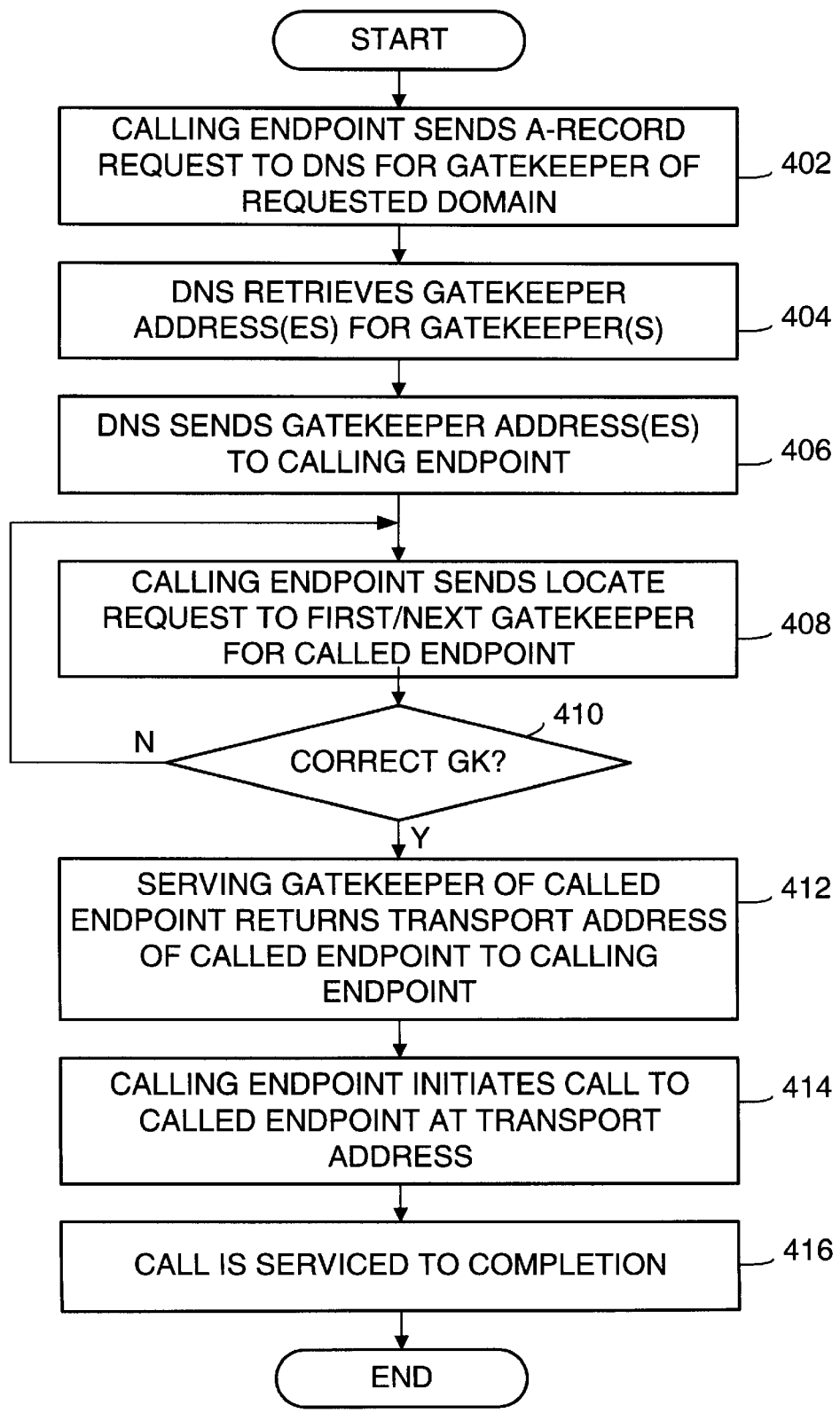
FIG. 4 is a logic diagram illustrating operation according to the present invention in initiating and completing a call.

FIG. 4 is a logic diagram illustrating operation according to the present invention in initiating and completing a call. Operation commences at step 402 wherein a calling endpoint sends an A-record request to the DNS, requesting the IP address of the Gatekeeper for the domain. Such an A-record request is in the form of calledsubscriber@Gatekeeper.ABC.domain. The DNS then retrieves Gatekeeper transport addresses for all Gatekeepers indexed by the domain name ABC.domain at step 404 and sends the transport addresses to the calling endpoint at step 406.

At step 408, the calling endpoint sends a Location Request to a fist/next Gatekeeper at a respective transport address with the user name of the called endpoint. If the Gatekeeper to which the Location Request is sent is the correct Gatekeeper, i.e., the Gatekeeper serves the called endpoint, as determined at step 410, operation proceeds to step 412. If not, operation returns to step 408 where a Location Request is sent to the next Gatekeeper as identified by the transport addresses returned at step 406. However, if Location Requests are sent to all Gatekeepers, via respective transport addresses, and none serve the called endpoint, operation ends.

At step 412, if the Gatekeeper to which the Location Request was sent is the correct Gatekeeper, the Gatekeeper returns the transport address for the called endpoint at step 412. Then, the calling endpoint initiates a call to the called endpoint at a respective transport address, as returned by the serving Gatekeeper, at step 414. The call is then set up by a serving Gatekeeper and serviced to completion at step 416. From step 416, operation ends.

Figure 5:
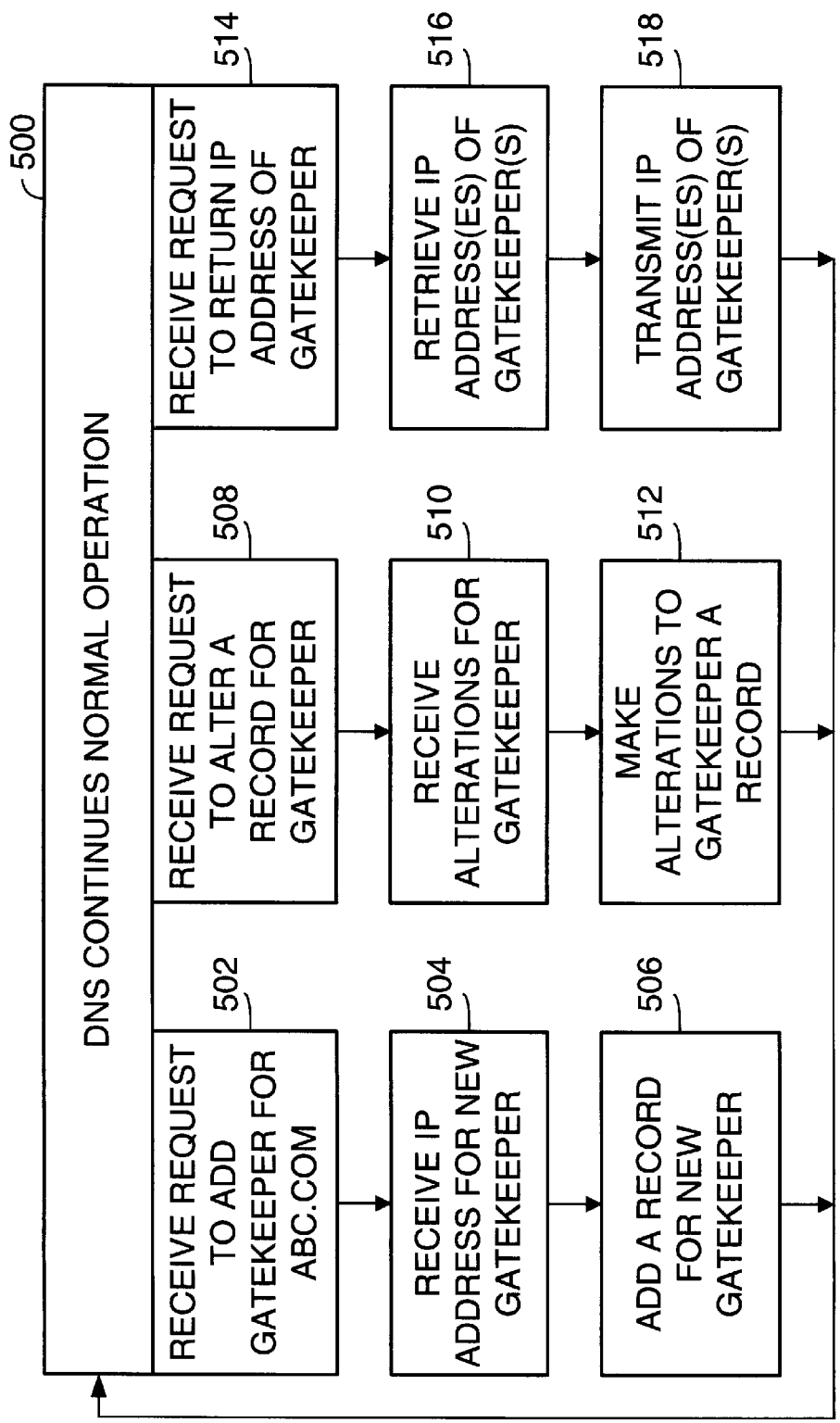
FIG. 5 is a logic diagram illustrating operation of a Domain Name Server according to the present invention.

FIG. 5 is a logic diagram illustrating operation of a Domain Name Server according to the present invention. During normal operation, the DNS continues operation at step 500 and may perform known functions unrelated to the present invention. At step 502 the DNS receives a request to add a Gatekeeper for an IP telephony system having the domain name ABC.domain. The DNS retrieves an IP address for the Gatekeeper at step 504 and then adds one or more records for the Gatekeeper under the domain name ABC.domain at step 506.

For example, if the Gatekeeper is the first Gatekeeper for the domain name, an A record will be added within the DNS identifying the Gatekeeper as "Gatekeeper.ABC.domain" with the IP address for the Gatekeeper. However, if the Gatekeeper is a subsequently added Gatekeeper, another A record will be added with the IP address for the Gatekeeper and a separate A record may be added, with a particular designation for the Gatekeeper (such as was discussed with reference to FIG. 3B where multiple Gatekeepers were included for the domain name, each having an entry under Gatekeeper and an entry under GatekeeperX, where X is the designation for the Gatekeeper). From step 506, operation proceeds to step 500.

At step 508 the DNS receives a request to alter a record for a Gatekeeper. Such a request may be made when a Gatekeeper is removed from service, has a change in its IP address or otherwise is altered. At step 510, the DNS receives the requested alterations for the Gatekeeper and at step 512, the DNS makes the alterations. From step 512, operation proceeds to step 500.

At step 514 the DNS receives a request from an endpoint to return an IP address of a Gatekeeper(s) corresponding to an appended domain name, e.g., "ABC.domain". At step 516 the DNS retrieves the IP address(es) of the Gatekeeper(s) corresponding to the domain name. The DNS then transmits the IP addresses to the calling endpoint at step 518. From step 518, operation returns to step 500.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. In an Internet Telephony system that includes a Gatekeeper, a method of apprising calling endpoints of a transport address for the Gatekeeper comprising:

storing the transport address for the Gatekeeper on a domain name server that is associated with a domain name of the Internet Telephony system;

the domain name server receiving a Gatekeeper transport address request from a calling endpoint that includes the domain name;

the domain name server accessing the transport address of the Gatekeeper using the domain name; and the domain name server returning the transport address to the calling endpoint.

2. The method of claim 1, wherein the Gatekeeper address transport request seeks an IP address for "Gatekeeper.domainname" wherein "domainname" is the domain name of the Internet Telephony System.

3. The method of claim 1, further comprising storing the transport address for an additional Gatekeeper on the domain name server, the additional Gatekeeper indexed by the domain name of the Internet Telephony system.

4. The method of claim 3, wherein a transport address for each Gatekeeper serving the Internet Telephony system is returned to the calling endpoint.

5. The method of claim 3, wherein each Gatekeeper has multiple records on the domain name server.

6. The method of claim 1, wherein an A record is employed to store the transport address for the Gatekeeper.

7. In an Internet Telephony system that includes a Gatekeeper, a method of supporting call setup and servicing, the method comprising:

storing the transport address for the Gatekeeper on a domain name server that is associated with a domain name of the Internet Telephony system;

the domain name server receiving a Gatekeeper transport address request from a calling endpoint that includes the domain name;

the domain name server accessing the transport address of the Gatekeeper using the domain name;

the domain name server returning the transport address to the calling endpoint;

the Gatekeeper receiving a Locate Request from the calling endpoint in which the calling endpoint seeks a transport address for a called endpoint, the called endpoint identified by a user name;

the Gatekeeper transmitting the transport address to the calling endpoint; and the Gatekeeper setting up and servicing a call between the calling endpoint and the called endpoint.

8. The method of claim 7, wherein the Gatekeeper address transport request seeks an IP address for "Gatekeeper.domainname" wherein "domainname" is the domain name of the Internet Telephony System.

9. The method of claim 7, further comprising storing the transport address for an additional Gatekeeper on the domain name server, the additional Gatekeeper indexed by the domain name of the Internet Telephony system.

10. The method of claim 9, wherein a transport address for each Gatekeeper serving the Internet Telephony system is returned to the calling endpoint.

11. The method of claim 9, wherein each Gatekeeper has multiple records on the domain name server.

12. The method of claim 7, wherein an A record is employed to store the transport address for the Gatekeeper.

13. An Internet Telephony system that supports a call between a calling endpoint and a called endpoint across an Internet Protocol network, the Internet Telephony system comprising:

a Gatekeeper that manages calls within the Internet Telephony system and which is accessed by a transport address;

a domain name server that stores the transport address of the Gatekeeper and that indexes the transport address by a domain name of the Internet Telephony system;

the calling endpoint accessing the transport address of the Gatekeeper stored on the domain name server using the domain name; and the domain name server returning the transport address to the calling endpoint.

14. The Internet Telephony System of claim 13, wherein the transport address is accessed via a request that seeks an IP address for "Gatekeeper.domainname" wherein "domainname" is the domain name of the Internet Telephony System.

15. The Internet Telephony System of claim 13, further comprising a second Gatekeeper, wherein the domain name server further stores a transport address for the second Gatekeeper, the second Gatekeeper also indexed by the domain name of the Internet Telephony system.

16. The Internet Telephony System of claim 15, wherein a transport address for each Gatekeeper serving the Internet Telephony system is returned to the calling endpoint.

17. The Internet Telephony System of claim 15, wherein each Gatekeeper has multiple records on the domain name server.

18. The Internet Telephony System of claim 13, wherein the Internet Protocol network is divided into two Gatekeeper zones and each of the Gateways services a respective Gatekeeper zone.

19. The Internet Telephony System of claim 13, wherein an A record is employed to store the transport address for the Gatekeeper.

20. The Internet Telephony System of claim 13, further comprising at least one Gateway coupled to the Internet Protocol network.

* * * * *